Aug. 17, 1926. 1,596,235
W. W. BOUSE
DIRECTION SIGNAL FOR MOTOR VEHICLES
Filed Sept. 19, 1925
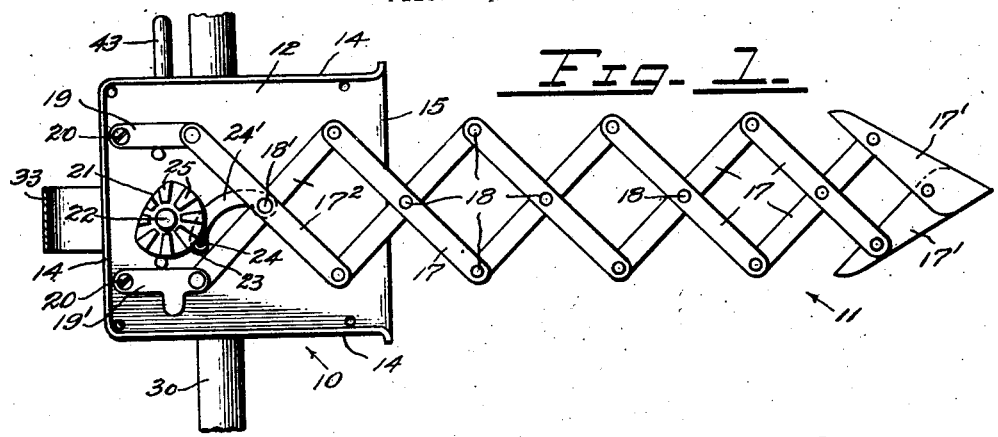
INVENTOR:
Walter W. Bouse
BY
Pierre James
ATTORNEY Patented Aug. 17, 1926.

1,596,235

UNITED STATES PATENT OFFICE.

WALTER W. BOUSE, OF SEATTLE, WASHINGTON.

DIRECTION SIGNAL FOR MOTOR VEHICLES.

Application filed September 19, 1925. Serial No. 57,326.

This invention relates to a signal for motor vehicles and more particularly to means for indicating to pedestrians or another vehicle an anticipated stopping or change in the direction of travel of the vehicle provided with the signal.

The object of the invention, generally, is to provide a simple, compact and conveniently operated signal device which will be efficient in action and serve to lessen the number of casualties occurring in vehicle traffic.

More specific objects and advantages of the invention will appear in the following specification.

The invention consists in the novel construction, arrangement and combination of parts hereinafter described and claimed.

In the accompanying drawing,—

Figure 1 is a front elevational view of a signal embodying the principles of my invention, illustrated as applied to a portion of a vehicle's top-frame, the indicator arm being shown extended, and a part of the housing cover-member removed. Fig. 2 is a view similar to Fig. 1 with the indicator arm in its contracted position within the housing. Fig. 3 is a transverse vertical section of the signal device, taken substantially on line 3—3 of Fig. 2, and including the cover member not shown in Figs. 1 and 2. Fig. 4 is a rear elevation of the device illustrated in its Fig. 2 position. Fig. 5 is a plan view of the device with parts broken away and parts shown in horizontal section.

In said drawing the reference numeral 10 represents, as a whole, a box constituting the housing for an extensible indicator, or semaphore, which is denoted by 11. Said housing is of a substantially rectangular form and, as shown, comprises a back member 12 and a cover member 13 having along three sides interfitting rim elements 14, the fourth side of the housing is open as at 15. Said members are rigidly secured together as by means of bolts 16 which are shown in Fig. 3. The signalling device proper consists of a system of links 17, $17^1$ and $17^2$ arranged as shown in Fig. 1, and the respective links being crossed and connected with each other by means of pivots 18 to afford what is known as lazy-tongs.

The outermost links $17^1$ being formed in the semblance of an arrow head. The innermost links $17^2$ being connected by complementary links 19—$19^1$ and pivots 20 to the housing back member 12.

Located within the housing 10 is a wheel 21 rigidly secured to or formed integral with an operating shaft 22. The wheel 21 is provided at its periphery with an apertured lug 23 to which is connected, by a pivotal pin 24, an end of a link $24^1$ whose other end is connected by the pivotal pin $18^1$ which also serves to pivotally connect the lazy-tongs links $17^2$ where the latter cross each other.

The lug 23 and wheel 21 constitute, in effect, a crank arm with respect to the shaft whereby the lazy-tongs may be projected from and retracted into the housing. Such crank-arm is moreover, arranged to carry the pin 24 thereof beyond what is termed the "dead center" with respect to the axes of the shaft 22 and pivot $18^1$ of the lazy-tongs, thereby locking the lazy-tongs against accidental dislocation when brought into either its extended or contracted positions as represented in Figs. 1 and 2, respectively. Means are provided for releasably coupling the shaft 22 with the housing 10 to turn the housing together with the lazy-tongs about the axis of the shaft.

As shown, said coupling means consists of the provision upon the wheel 21 of crown teeth 25 which are engageable between a circular series of crown teeth 26 provided on the housing cover 13. By the provision of teeth upon the housing cover and upon said wheel, the same serve as complementary clutch members, the wheel member being axially shiftable with the shaft.

The housing is provided at the rear side of its back member 12 with one or more ribs 27, two being shown, which are adapted to be engaged in grooves 28, $28^1$ and $28^2$, selectively, provided in a bracket member 29. This bracket member is adapted to be rigidly secured to a support such, for example, as the post 30 of the top frame of the vehicle with which the device is employed.

As shown in Figs. 4 and 5, the preferred manner of securing said bracket member to the post consists of employing a clamping piece 31 having one of its ends bear against a part $29^1$ of the member referred to; its other end bearing against the rear side of the post 30; and screws 32 extending through holes provided in the clamping piece, intermediate its length, engaging in screw threaded holes in the part 29² of the member.

The securement of the bracket member 29 to its support is such that the bracket grooves 28 will be in position to receive the ribs 27 of the housing to retain the latter in a horizontal position or parallel to the road surface for the vehicle and likewise correspond with the longitudinal axis of the lazy-tongs signal arm as represented by broken line A—A in Fig. 4. The grooves 28¹ and 28² are arranged when engaged, respectively, by the housing ribs 27 to incline the arm axis as represented by lines B—B and C—C in the view referred to. The turning the housing from one to another of such positions is effected about the axis of the shaft 22.

33 represents a plate spring having one end secured to the bracket 29, thence extending as a loop about an end of the housing 10 to bear against the cover 13 for the purpose of retaining the housing ribs 27 in engaged relation with selected parts of the bracket grooves, said spring permitting the housing to be forcibly moved forwardly out of engagement with the bracket when it is desired to change the angular relation of the arm axis.

34 represents a second spring one end of which, as illustrated in Fig. 5, is by preference secured to the spring 33 and its other end bears against the end of the shaft 22 for the purpose of yieldably retaining the movable clutch member—that is to say, the toothed wheel 21—out of couple with the housing, whereupon the turning of the shaft will serve to project and retract the signal arm from and into the housing.

The shaft is journaled in a hub element 35 of the bracket 29. 36 represents a collar rotatably mounted upon the bracket hub 35 and prevented from being withdrawn therefrom by means of a pin 37 extending through the collar into a peripheral groove of the hub. Integral with said collar and depending therefrom is a pair of arms 38 which constitute with the collar what will be hereinafter termed the hanger.

Fulcrumed by means of a pin 39 to said hanger is a lever having one of its arms 40 pivotally connected by a pin 41 to the rear end of the shaft 22 and its other arm 43 provides a handle whereby the signal devices are manually controlled.

In the use of my signal device the lazy-tongs signal arm is, in each instance, extended and is employed horizontally to indicate the driver's intention of turning his vehicle to the left, for a right hand turn when the outer end of the signal arm is elevated and for stopping when it is directed downwardly.

For operating, the driver of the vehicle revolubly moves the lever 40—43 together with the hanger 36—38 about the axis of the shaft 22 to effect, through the medium of the shaft crank, the extension of the lazy-tongs signal arm into signalling position, and the retraction of the signal arm into its sheathed position within the housing 10.

To turn the housing and the signalling arm for conveying different signals, the operator swings the lever 40—41 about its fulcrum pin 39 to force the shaft 22 endwise in opposition to the springs 34 and 33, successively, to first couple the wheel, or clutch member, 21 into couple with the housing 10 and also move the housing to cause the ribs 27 thereof to become disengaged from the grooves 28, 28¹ or 28², of the bracket, the housing and handle then occupying the relative positions in which they are represented by dotted lines 10ª and 43ª in Fig. 3; whereupon the housing and signalling arm are rotated with the shaft by revolving the operating handle 43.

When the housing is thus suitably turned, the springs 34 and 33 are permitted to act to uncouple the clutch and return the housing into engaged relation with the bracket.

45 represents a bowed spring plate secured to the inner surface of the housing member 13 and bears against the signalling arm 11 to obviate any rattling between the parts thereof.

While I have illustrated and described in detail the signalling device now preferred by me I do not wish to be understood as confining myself specifically thereto, except as limited by the appended claims.

What I claim, is,—

1. A signal for vehicles comprising a bracket adapted to be secured to a support upon the vehicle, a housing connected to said bracket for rotary movement about a substantial axis, interengageable means provided upon the bracket and the housing for coupling the latter in predetermined rotary positions to the bracket, a lazy-tongs signal arm provided within the housing, a shaft journaled in said bracket, operative connections between said shaft and the arm, a clutch device carried by the shaft and engageable with the housing for rotatably connecting the same together, a spring tending to retain said clutch device in its disengaged relation with the housing, and a means for disengaging the housing from the bracket and for actuating said clutch device, said last named means also serving to rotate the housing and effect the projecting and sheathing of the arm from and into said housing.

2. A signal for vehicles comprising a bracket adapted to be secured to a support upon the vehicle, a housing rotatably connected to said support, interengageable means provided upon the bracket and the housing for coupling the latter in predetermined rotary positions to the bracket, a lazy-tongs signal arm provided within the housing, a shaft journaled in said bracket, operative connections between said shaft and the arm, a clutch device carried by the shaft and engageable with the housing for rotatably connecting the same together, a spring acting against the shaft and tending to retain said clutch device in its disengaged relation with the housing, and a means acting in opposition to said spring for disengaging the housing from the bracket and for actuating said clutch device, said last named means also serving to rotate the housing and effect the projecting and sheathing of the arm from and into said housing.

3. A signal for vehicles comprising a bracket adapted to be secured to a support upon the vehicle, a housing rotatably connected to said support, interengageable means provided upon the bracket and the housing for coupling the latter in predetermined rotary positions to the bracket, a spring tending to retain said housing in its coupled relation with the bracket, a lazy-tongs signal arm provided within the housing, a shaft journaled in said bracket, operative connections between said shaft and the arm, a clutch device carried by the shaft and engageable with the housing for rotatably connecting the same together, a second spring acting against the shaft and tending to retain said clutch device in its disengaged relation with the housing, and a means acting in opposition to said springs for disengaging the housing from the bracket and for actuating said clutch device, said last named means also serving to rotate the housing and effect the projecting and sheathing of the arm from and into said housing.

4. In a signal for vehicles, the combination with a bracket adapted to be secured to a vehicle, a lazy-tongs arm, a housing therefor, said housing being connected to said bracket for rotary movement about a horizontal axis, a shaft journaled in said bracket and extending into said housing, and operative connections between said shaft and the arm, of devices for coupling the housing to the shaft, and means for actuating said shaft to effect endwise movement to said arm said means also serving to effect rotary movements to the arm about the axis of said shaft.

Signed at Seattle, Washington, this 9th day of September, 1925.

WALTER W. BOUSE.